Figure 1:
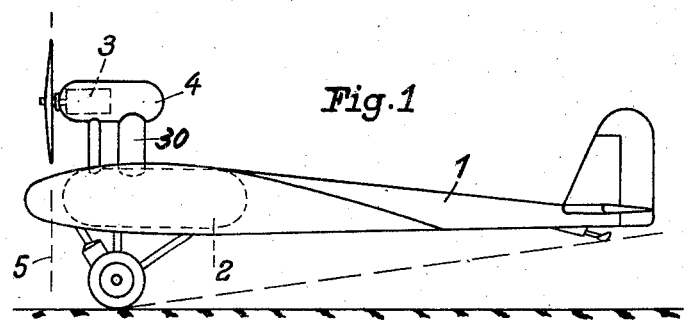

April 3, 1934.  H. JUNKERS  1,953,234
AIRCRAFT
Filed June 27, 1931  2 Sheets-Sheet 1

Inventor:
Hugo Junkers
by Karletinhauer
Atty.

April 3, 1934.   H. JUNKERS   1,953,234
AIRCRAFT
Filed June 27, 1931   2 Sheets-Sheet 2

Inventor:
Hugo Junkers
by Karl Richter
Atty.

Patented Apr. 3, 1934

1,953,234

UNITED STATES PATENT OFFICE 1,953,234

AIRCRAFT

Hugo Junkers, Dessau, Germany

Application June 27, 1931, Serial No. 547,383
In Germany July 2, 1930

7 Claims. (Cl. 244—14)

My invention relates to aircraft and more particularly to aircraft designed to normally travel at high altitudes and which must therefore be equipped with airtight compartments for the passengers and crew, in which a pressure corresponding to the pressure of the atmosphere at ground level is maintained.

If in such craft, for instance in airplanes, propellers are so arranged that their axes extend on the outside of the compartments, great risk to the persons in these compartments is involved by parts of the propellers which may become detached and hurled against the compartments. In normal aircraft, i. e. aircraft lacking airtight compartments, it is possible to so arrange the accommodation for the passengers and crew that they will not be hit by propeller fragments but in aircraft having airtight compartments the risk is not eliminated thereby because the air will escape from a compartment if its walls are damaged by propeller fragments and therefore the persons in the compartment, though they may not be hit, are exposed to certain death by suffocation at great altitudes.

In order to eliminate such risks, I so arrange the propellers, that their planes of rotation do not intersect with the airtight compartments.

With directly driven propellers arranged on the outside of a compartment, the engine, and with propellers actuated through the medium of intermediate shafts, the bearings of the propeller, are placed in such a position with respect to the front or rear ends of the compartment that fragments from the propeller will not hit the compartments. If the engines are arranged in separate airtight rooms connected with the passenger compartments the arrangement must be such that propeller planes nowhere intersect with a passenger compartment, an engine room or a gangway, in short, with any airtight chamber. If the aforesaid arrangement of the propellers is not practicable on account of the general design of the craft, or is not desirable for other reasons, risk may be eliminated by subdividing the airtight passenger compartments or engine rooms into a plurality of sub-compartments and connecting these by gangways which must also be airtight but in which persons do not stay permanently. Airtight doors are then provided between the gangway and each sub-compartment. In craft of this type the propellers, or any one of them, may be so arranged that their planes intersect with the gangways so that if a fragment from the propeller damages the wall of the gangway, the air escapes only from the gangway, but not from the sub-compartments.

Preferably instruments are provided in the sub-compartments which indicate the escape of air from the gangway, and warn persons that the gangway must not be entered.

I may further so arrange the doors connecting the gangways with the sub-compartments, that they can only be opened towards the sub-compartments so that the pressure in the sub-compartments prevents or counteracts opening of the doors, if the pressure in the gangway has been dangerously reduced. Means may also be provided for automatically bolting the doors if a predetermined pressure gradient between the compartment and the gangway is exceeded.

In the drawings affixed to this specification and forming part thereof various types of airplanes embodying my invention are illustrated diagrammatically by way of example.

In the drawings

Figure 2:
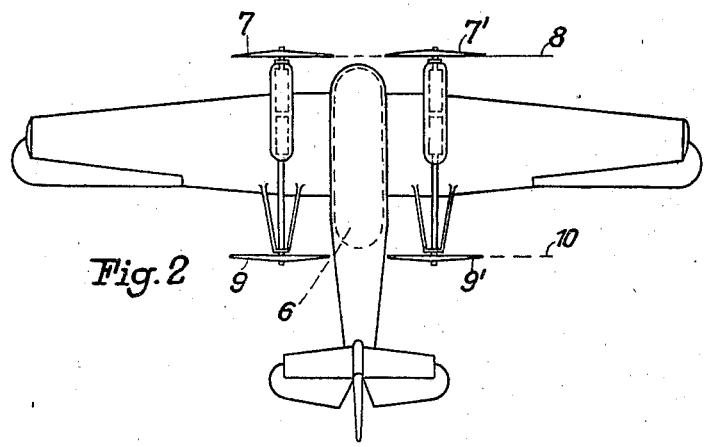
Figure 3:
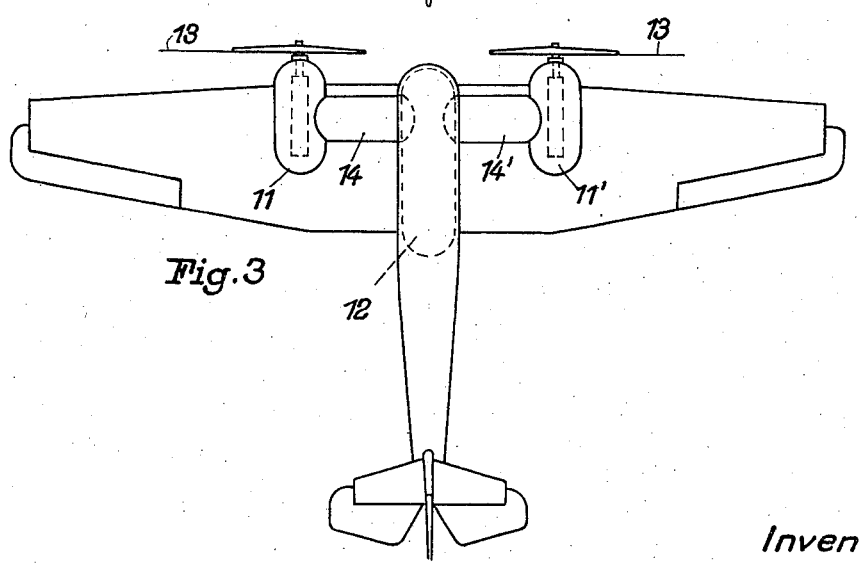
Figure 4:
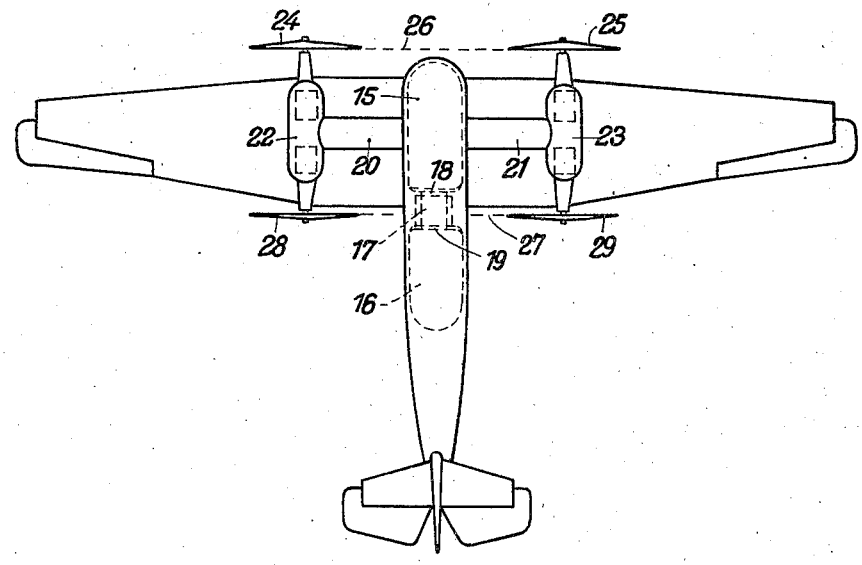
Figure 5:
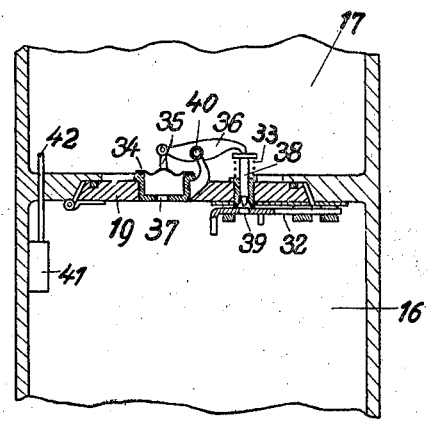

Fig. 1 is an elevation of an airplane having a single engine in an airtight room, a single tractor propeller, and a single compartment, Fig. 2 is a plan view of an airplane having four engines, two tractor and two pusher propellers, and a single compartment, Fig. 3 is a plan view of an airplane having two engines in airtight rooms, two tractors, and a single compartment, Fig. 4 is a plan view of an airplane having four engines and an airtight room for each two engines, two tractor and two pusher propellers and a passenger compartment divided into two sub-compartments, with a gangway between them, Fig. 5 is a section of a gangway door, drawn to a larger scale.

Referring now to the drawings, and first to Fig. 1, the fuselage of the airplane 1 is equipped with an airtight compartment 2 for the accommodation of the passengers, and an airtight engine room 4 above the wings for the accommodation of the engine 3 and its operator. The compartment 2 is connected to the room 4 by a vertical gangway 30. The propeller 5 is so arranged that its plane of rotation does not intersect with the compartment 2 and is parallel to the gangway 30.

Referring to Fig. 2, 6 is an airtight passenger compartment in the fuselage of the airplane. Tractor propellers 7, 7' and pusher propellers 9, 9' are arranged at opposite sides of the fuselage. The propellers, each with an engine of its own, are so arranged that the plane 8 of the tractors and the plane 10 of the pushers do not intersect with the compartment 6.

Referring now to Fig. 3, the two tractors 13, 13 have engines arranged in airtight rooms 11 and 11', 12 is a passenger compartment in the fuselage, and 14, 14' are gangways connecting the engine rooms to the passenger compartment. The plane of the propellers 13 is so arranged that it does not intersect with the rooms 11, 11' and the compartment 12, and is parallel to the gangways 14, 14'.

Referring now to Fig. 4, 15 and 16 are two subcompartments in the fuselage which are connected by a gangway 17, and 18, 19 are doors between the subcompartments and the gangway. 22 and 23 are the engine rooms for the tractors 24 and the pushers 29, and 20, 21 are gangways connecting the rooms to the compartment 15. The plane 26 of the tractors is in front of the compartment 15 and parallel to the gangways 20, 21, and only the plane 27 of the pushers 28, 29 intersects the gangway 17 so that if this gangway is damaged by propeller fragments the compartments 15 and 16 are not involved.

Fig. 5 shows in detail automatic means for bolting a door, for instance the door 19 between the subcompartment 16 and the gangway 17. The door 19 is so arranged that it opens only toward the subcompartment 16 so that if the pressure escapes from the gangway 17 the excess pressure in the subcompartment 16 counteracts or prevents the opening of the door.

In order to absolutely prevent the opening of the door when there is a dangerous reduction of pressure in the gangway 17, a bolt 32 is provided which is under the control of a diaphragm 34 in the door 19. The chamber of the diaphragm 34 is connected to the subcompartment 16 by a hole 37. 38 is a locking pin adapted to enter a hole 39 in the bolt 32, 33 is a spring which tends to move the pin out of the hole 39, 36 is a double-armed lever which is fulcrumed at 40, and 35 is a rod connecting one end of the lever 36 to the diaphragm 34 while its other end bears on the locking pin 38.

If the pressure in the subcompartment 16 exceeds the pressure in the gangway 17 the diaphragm 34 bulges in the direction of the gangway and the pin 38 is pushed into the hole 39 of the bolt through the medium of the lever 36.

41 is a pressure gauge in the subcompartment 16 and 42 is a pipe connecting it to the gangway 17 so that it will indicate any reduction of the pressure in the gangway.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An aircraft comprising an airtight compartment subdivided into two subcompartments, a gangway connecting said subcompartments, means for interrupting the connection of said gangway with said subcompartments, and a propeller so arranged on the outside of said subcompartments and said gangway that its plane of rotation intersects with said gangway but not with said subcompartments.

2. An aircraft comprising an airtight compartment subdivided into two subcompartments, a gangway connecting said subcompartments, a door between each subcompartment and said gangway which opens only toward the adjacent subcompartment, and a propeller so arranged on the outside of said subcompartments and said gangway that its plane of rotation intersects with said gangway but not with said subcompartments.

3. An aircraft comprising an airtight compartment subdivided into two subcompartments, a gangway connecting said subcompartments, a door between each subcompartment and said gangway which opens only toward the adjacent subcompartment, means under the control of the pressure gradient in said subcompartment and said gangway for locking said door against opening, and a propeller so arranged on the outside of said subcompartments and said gangway that its plane of rotation intersects with said gangway but not with said subcompartments.

4. An aircraft comprising an airtight compartment subdivided into two subcompartments, a gangway connecting said subcompartments, a door between each subcompartment and said gangway which opens only toward the adjacent subcompartment, a bolt on said door, means under the control of the pressure gradient in said subcompartment and said gangway for locking said bolt in the position in which it bolts said door, and a propeller so arranged on the outside of said subcompartments and said gangway that its plane of rotation intersects with said gangway but not with said subcompartments.

5. An aircraft comprising an airtight compartment subdivided into two subcompartments, a gangway connecting said subcompartments, a door between each subcompartment and said gangway which opens only toward the adjacent subcompartment, a bolt on said door, means including a diaphragm under the control of the pressure gradient in said subcompartment and said gangway for locking said bolt in the position in which it bolts said door, and a propeller so arranged on the outside of said subcompartments and said gangway that its plane of rotation intersects with said gangway but not with said subcompartments.

6. An aircraft comprising an airtight compartment subdivided into two subcompartments, a gangway connecting said subcompartments, means for interrupting the connection of said gangway with said subcompartments, an instrument in one of said subcompartments for indicating the pressure in said gangway, and a propeller so arranged on the outside of said subcompartments and said gangway that its plane of rotation intersects with said gangway but not with said subcompartments.

7. An aircraft comprising an airtight pressure-proof passenger compartment, an airtight pressure-proof engine compartment substantially parallel to said passenger compartment, a passage leading from one to the other compartment, a propeller shaft extending into said engine compartment and a propeller on said shaft, the plane of rotation of said propeller extending outside of said passenger compartment.

HUGO JUNKERS.